United States Patent
Meinke

(10) Patent No.: US 6,508,501 B1
(45) Date of Patent: Jan. 21, 2003

(54) FUEL FILLER DOOR ASSEMBLY

(75) Inventor: Joseph S. Meinke, Gowen, MI (US)

(73) Assignee: Adac Plastics Inc., Grand Rapids, MI (US)

( * ) Notice: Subject to any disclaimer, the term of this patent is extended or adjusted under 35 U.S.C. 154(b) by 0 days.

(21) Appl. No.: 09/934,191

(22) Filed: Aug. 21, 2001

(51) Int. Cl.$^7$ ............................................. B62D 25/00
(52) U.S. Cl. ................... 296/97.22; 220/8.62; 220/297; 280/834; 280/853
(58) Field of Search ............................... 296/97.22, 1.1; 220/DIG. 33, 86.2, 297, 298; 280/834, 853

(56) References Cited

U.S. PATENT DOCUMENTS

| | | | | |
|---|---|---|---|---|
| 2,524,823 A | * | 10/1950 | Noyes | 220/DIG. 33 |
| 2,552,053 A | * | 5/1951 | Miller | 220/86.2 |
| 3,001,668 A | * | 9/1961 | Burk et al. | 220/298 |
| 3,918,605 A | * | 11/1975 | Butler | 220/298 |
| 3,931,891 A | * | 1/1976 | Peppler | 220/298 |
| 4,341,322 A | * | 7/1982 | Heinke | 220/210 |
| 4,653,660 A | | 3/1987 | Shaw | |
| 5,118,155 A | | 6/1992 | Koop | |
| 5,165,749 A | * | 11/1992 | Sheppard | 296/97.22 |
| 5,437,491 A | | 8/1995 | Nedbal et al. | |
| RE36,557 E | * | 2/2000 | Brown | 220/DIG. 33 |
| 6,026,554 A | | 2/2000 | Parker | |
| 6,033,006 A | | 3/2000 | Bovellan et al. | |
| 6,079,582 A | * | 6/2000 | Nickel et al. | 220/DIG. 33 |

FOREIGN PATENT DOCUMENTS

| | | | | |
|---|---|---|---|---|
| GB | 798739 | * | 7/1958 | 220/298 |
| GB | 2026452 | * | 2/1980 | 220/86.2 |

* cited by examiner

*Primary Examiner*—D. Glenn Dayoan
*Assistant Examiner*—H. Gutman
(74) *Attorney, Agent, or Firm*—Young & Basile, P.C.

(57) ABSTRACT

A fuel filler door assembly is provided for a motor vehicle facilitating rapid and inexpensive installation. Installation is accomplished by passing a tubular sleeve main body portion of a housing of the fuel filler door assembly through an aperture in a lip in an outer panel of the vehicle to pass circumferentially spaced keys on the sleeve through circumferentially spaced keyways provided in the lip, pass an aperture in an inner end wall of the housing over the free end of the filler tube of the vehicle fuel tank to seat the inner wall on a flange carried by the filler tube, and seat a flange provided on an outer end of the housing on the outer panel lip; turning the housing to move the keys under the panel lip and trap the lip between the flange and the keys; and passing a screw fastener through the end wall of the housing for engagement with the filler tube flange.

17 Claims, 3 Drawing Sheets

FUEL FILLER DOOR ASSEMBLY

FIELD OF THE INVENTION

This invention relates to motor vehicle fuel delivery systems and, more particularly, to an improved fuel filler door assembly.

Motor vehicles typically include a fuel tank, a fuel filler tube extending from the fuel tank and terminating at a free end proximate an aperture in an outer panel of the motor vehicle, and a fuel filler door assembly positioned in the panel aperture and arranged to support the free end of the filler tube and facilitate the delivery of fuel to the free end of the filler tube for delivery to the fuel tank.

A myriad of fuel filler door assembly designs have been utilized in association with the evolution of the motor vehicle and, whereas these prior art designs have been generally satisfactory in supporting the free end of the filler tube and facilitating the delivery of fuel to the filler tube, they have tended to require a very expensive and labor intensive installation procedure, and the cost of this installation procedure is of course reflected in the final manufacturing cost of the vehicle.

SUMMARY OF THE INVENTION

This invention is directed to an improved fuel filler door assembly for a motor vehicle.

More specifically, this invention is directed to a fuel filler door assembly that is amenable to a simple and inexpensive installation on the associated motor vehicle.

The fuel filler door assembly of the invention is intended for positioning in an aperture in a panel of the motor vehicle to facilitate access to and support the free end of the filler tube extending from the fuel tank of the vehicle.

According to the invention, the assembly includes a housing including a sleeve having a diameter sized to fit in the aperture in the vehicle panel; an annular flange at an axially outer end of the sleeve sized to seat on the vehicle panel in surrounding relation to the aperture; a housing aperture defined at an axially inner end of the sleeve and sized to pass the free end of the filler tube therethrough; and a plurality of circumferentially spaced keys on an outer surface of the sleeve proximate the flange but spaced axially inwardly from the flange by a distance approximating the thickness of the vehicle panel. With this arrangement, the housing may be mounted in the vehicle panel simply by passing the keys inwardly through a plurality of circumferentially spaced keyways provided in the vehicle panel in surrounding relation to the aperture and thereafter rotating the housing to move the keys into coaction with solid portions of the panel intermediate the keyways.

According to a further feature of the invention, the housing includes an end wall at the axially inner end of the sleeve defining the housing aperture and the housing further includes a fastener hole in the inner end wall adapted to receive a fastener for coaction with the free end of the filler tube. This arrangement provides a simple and efficient means of precluding rotation of the installed housing relative to the panel.

According to a further feature of the invention, the assembly further includes a fuel filler door mounted on the housing for pivotal movement between a closed position seated on the annular flange to close the axially outer end of the sleeve and an open position pivoted outwardly away from the flange to allow access to the free end of the filler tube.

The invention also relates to a motor vehicle body structure assembly for association with a free end of a filler tube extending from a fuel tank of the vehicle. According to this aspect of the invention, the assembly comprises a vehicle body panel defining an outer surface of the vehicle and having an aperture therein; a plurality of keyways are provided in the panel in surrounding relation to the aperture; and a fuel filler assembly is provided including a housing including a sleeve having a diameter sized to be fitted in the panel aperture, an annular flange at an axially outer end of the sleeve sized to seat on the vehicle panel in surrounding relation to the panel aperture, means at an axially inner end of the sleeve defining an aperture sized to pass the free end of the filler pipe, and a plurality of keys on an outer surface of the sleeve proximate the flange but spaced axially inwardly from the flange by a distance approximating the thickness of the body panel and having a size and circumferential spacing corresponding to the size and circumferential spacing of the keyways in the body panel. With this arrangement, the housing may be mounted in the body panel by passing the keys inwardly through the respective keyways and thereafter rotating the housing to bring the keys into coaction with solid portions of the body panel intermediate the keyways.

According to a further feature of the invention, the vehicle body panel further defines a stop structure spaced angularly from each keyway for coaction with the respective key to limit and define the angular movement of the housing as it is rotated following passage of the keys through the keyways.

According to a further feature of the invention, the body panel includes an annular recess in surrounding relation to the aperture and the flange is sized to fit in the annular recess.

The invention also provides a method of installing a fuel filler door assembly in an aperture of a panel of the vehicle to facilitate access to and support the free end of a filler tube extending from the fuel tank of the vehicle. The method comprises providing a housing having a sleeve having a diameter sized to fit in the aperture in the vehicle panel; providing an annular flange at an anally outer end of the sleeve sized to seat on the vehicle panel in surrounding relation to the aperture; providing means at an axially inner end of the sleeve defining a housing aperture sized to pass the free end of the filler pipe; providing a plurality of circumferentially spaced keys on an outer surface of the sleeve proximate the flange but spaced axially inwardly from the flange by a distance approximating the thickness of the vehicle panel; providing a plurality of keyways in the panel in surrounding relation to the aperture and corresponding in size and circumferential spacing to the keys; passing the keys inwardly through the keyways to seat the housing flange on the vehicle panel and pass the housing aperture over the free end of the filler tube; and rotating the housing to move the keys into coaction with solid portions of the panel intermediate the keyways. With this methodology, the fuel filler door assembly may be mounted in the vehicle panel in a minimum of time and with a minimum of labor.

According to a further feature of the invention methodology, the method includes the further steps of providing an end wall at the axially inner end of the sleeve defining the housing aperture and providing means in the inner end wall adapted to receive a fastener for coaction with the free end of the filler tube. This methodology provides a simple and effective means of precluding rotating of the housing relative to the vehicle panel.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
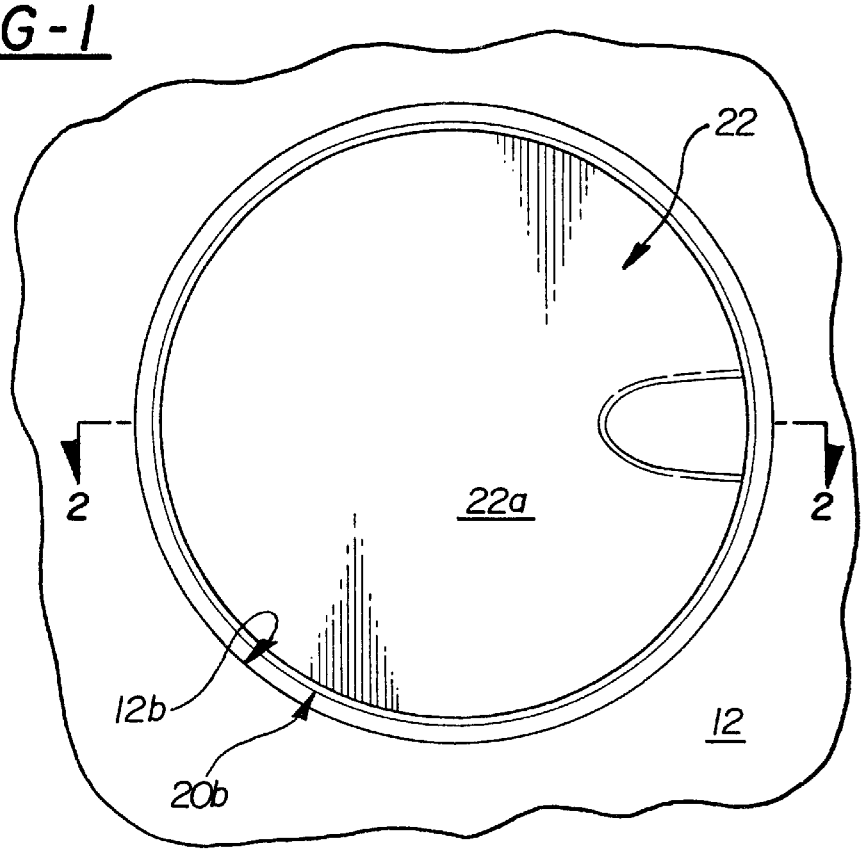
FIG. 1 is a side elevational view of a fuel filler door assembly according to the invention.
Figure 5:
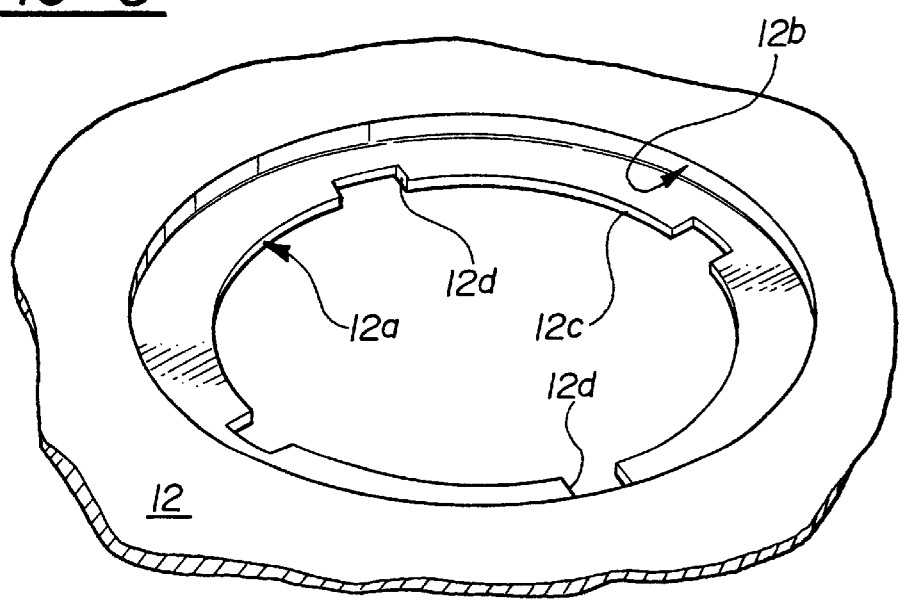
FIG. 5 is a perspective view of the vehicle panel structure.
Figure 2:
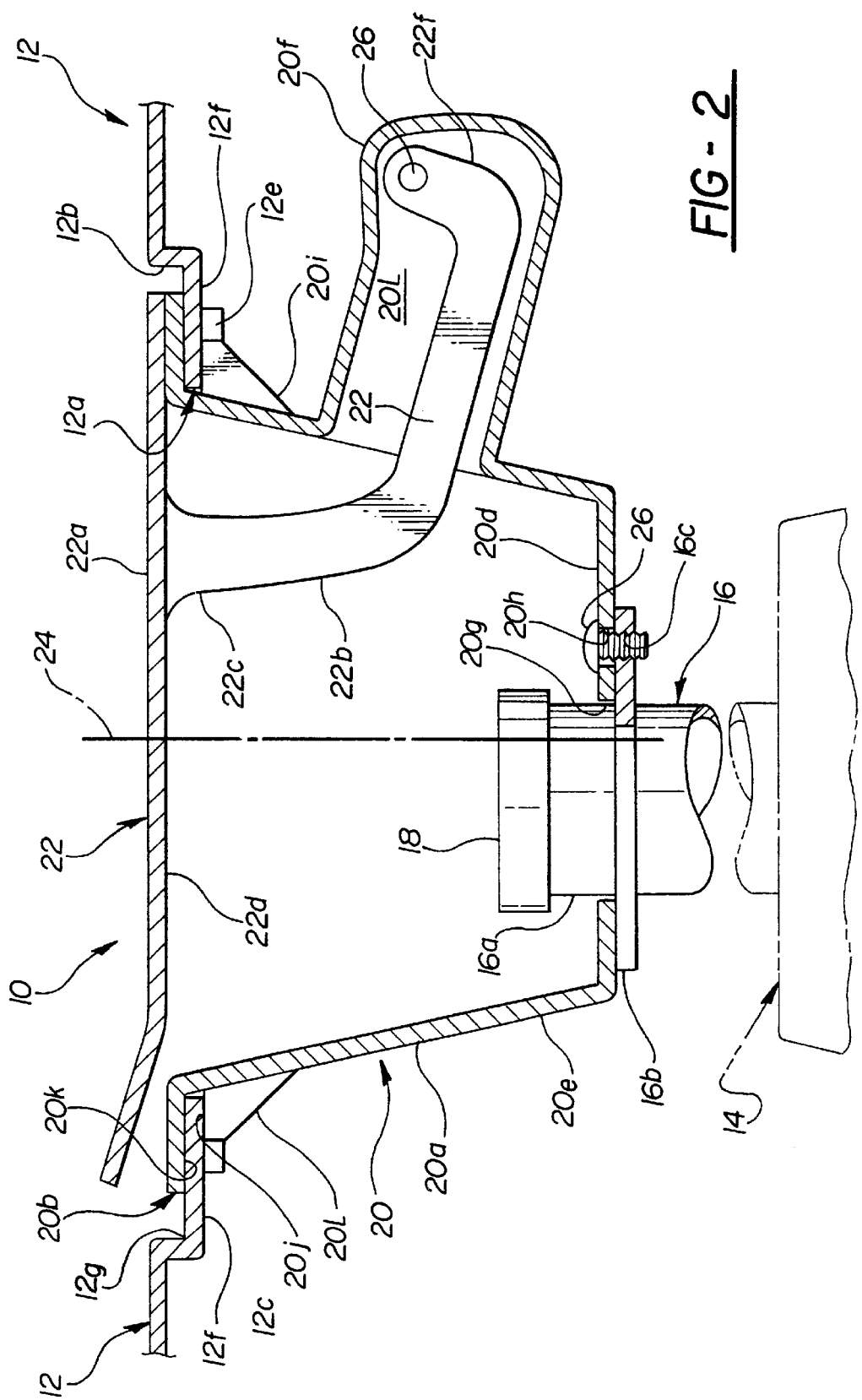
FIG. 2 is a cross sectional view taken on line 2—2 of FIG. 1.

The fuel filler door assembly 10 of the invention is intended for use with a motor vehicle having (FIGS. 1, 2 and 5) an outer panel 12 (such for example as a rear quarter panel) with a circular aperture or opening 12a sized to receive the fuel filler delivery assembly 10 of the invention. The vehicle in known manner further includes a fuel tank 14 having a filler tube 16 having a free end 16a positioned in juxtaposition to the panel opening 12a. The filler tube 16 further includes an annular external flange 16b fixedly positioned on the tube proximate but spaced from the free end of the tube and a filler tube screw cap 18 selectively closing the free end of the tube in known manner.

Figure 4:
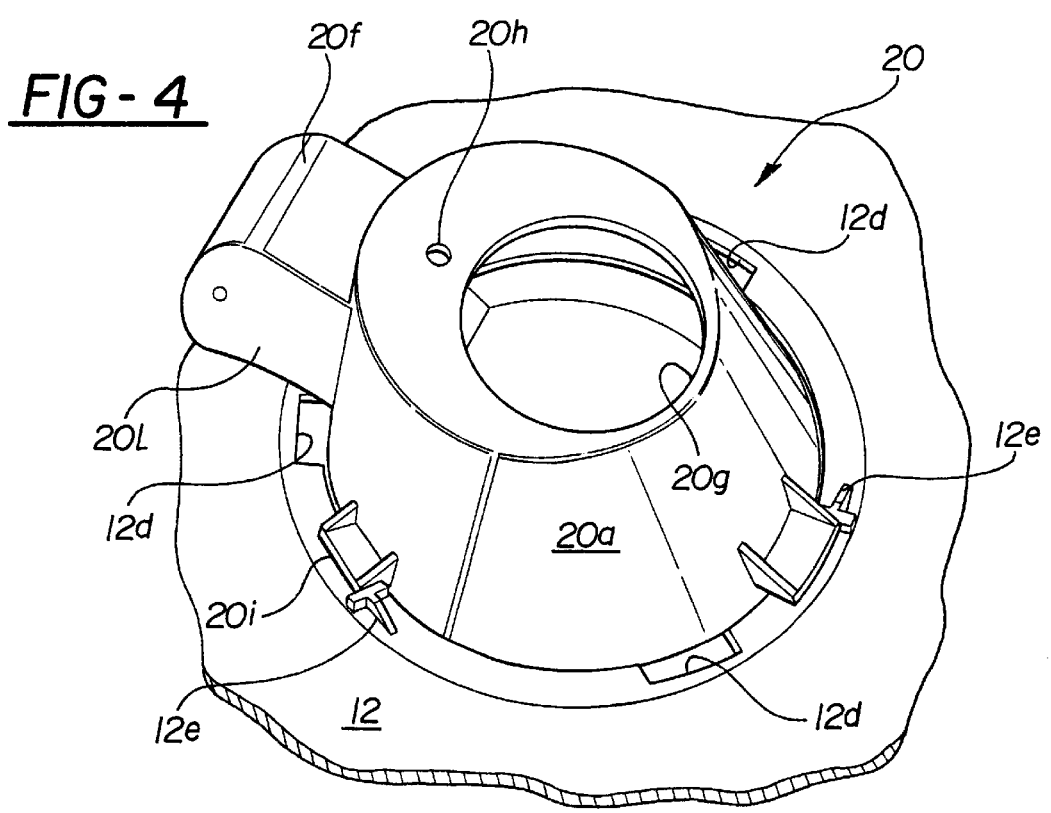
FIG. 4 is a perspective view of the housing installed in a vehicle panel structure.

Aperture 12a is defined by an annular recess 12b in surrounding relation to the aperture 12a and including an annular lip 12c. According to the invention, annular lip 12c is provided with a series or plurality of circumferentially spaced generally rectangular keyways 12d opening into the aperture 12a and a corresponding plurality of stop structures 12e (see also FIG. 4) are provided on the axially inner face 12f of lip 12c in angularly spaced relation to the respective keyways 12d. For example, as seen in the drawings, four keyways may be provided spaced at 90° intervals and four stop structures may be provided for respective coaction with the four keyways.

Figure 3:
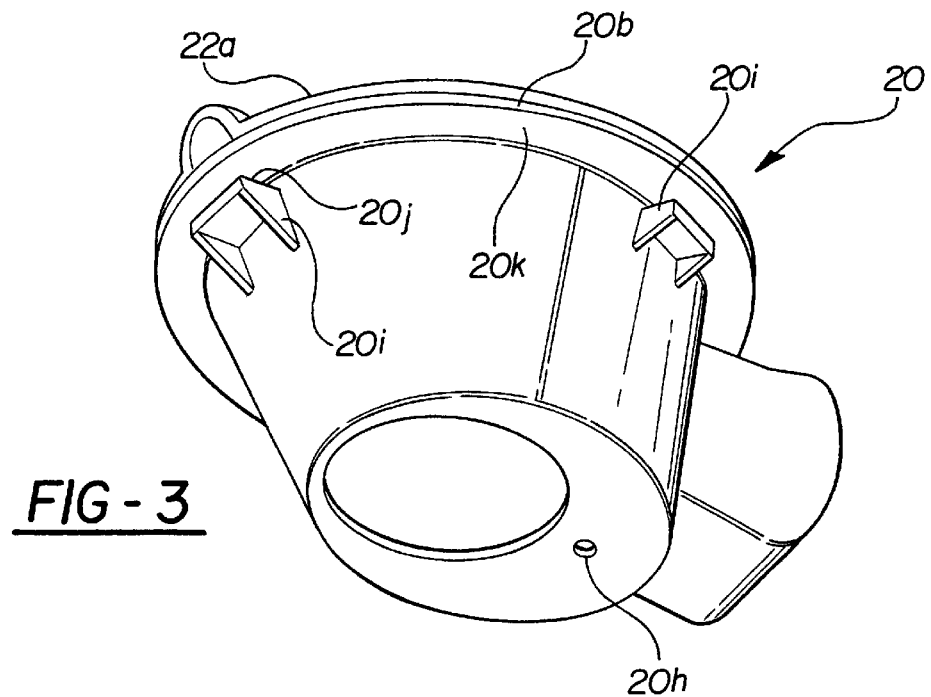
FIG. 3 is a perspective view of a housing employed in the invention fuel filler door assembly.

Fuel filler delivery door assembly 10 (FIGS. 2, 3 and 4) includes a housing 20 and a filler door 22.

Housing 20 may be formed of a suitable plastic material in a suitable molding operation and has a generally circular cross sectional configuration. Housing 20 includes a main body generally conical sleeve portion 20a, an annular radially outwardly projecting flange portion 20b at an axially outer end 20c of the sleeve portion, an inner end wall 20d at an axially inner end 20e of the sleeve portion, and a mounting structure 20f formed integrally with the sleeve portion 20a and projecting laterally from sleeve portion 20a intermediate annular flange portion 20b and inner end wall 20d. Inner end wall 20d defines an aperture 20g which is offset with respect to the center line 24 of the housing and a fastener hole 20h. Aperture 20g is sized to receive and support the free end 16a of filler tube 16 and hole 20h may be threaded for coaction with a standard screw or may be unthreaded for coaction with a self tapping screw.

Housing 20 further includes a series or plurality of keys 20i projecting radially outwardly from sleeve portion 20a proximate flange portion 20b and corresponding in number and circumferential spacing to the keyways 12d in vehicle outer panel 12. Keys 20i have a generally rectangular configuration and have a width sized to pass freely through rectangular keyways 12d. Each key 20i defines an axially outer face 20j spaced axially from the axially inner surface 20k of flange portion 20b by a distance generally corresponding to the thickness of lip 12c.

Filler door 22 may be formed of a suitable plastic material in a suitable molding operation and includes a main body door panel 22a having a circular configuration sized to fit within recess 12b and a pivot arm 22b extending integrally at one end 22c from the axially inner face 22d of the panel 22a. Pivot arm 22b further includes an intermediate portion 22e extending into the hollow of sleeve mounting structure 20f and a free end portion 22f pivotally mounted on a pivot pin 26 extending between the opposite side walls 20l of mounting structure 20f. Door 22 will be seen to be mounted on housing 20 for pivotal movement between a closed position seated on annular flange portion 20b to close the axially outer end of the sleeve and an open position pivoted outwardly away from the flange portion to allow access to the interior of the sleeve and to the filler tube 16. It will be understood that a spring (not shown) assists the opening movement of the door and resists the closing movement of the door, and that a catch mechanism (not shown) maintains the door in its closed position and may be released for example by an operator seated in the vehicle.

INSTALLATION

The installation of the fuel filler delivery assembly of the invention is extremely quick and simple as compared to prior art fuel filler door assemblies.

Specifically (with cap 18 removed, door 22 in its open position, and following installation of the fuel tank 14 and filler tube 16 in the vehicle and the formation of the keyways 12d and stop structures 12e in outer panel 12) the fuel filler delivery assembly is positioned proximate aperture 12a and rotated to align keys 20i with keyways 12d; the assembly is moved axially inwardly to pass keys 20i through keyways 12d, pass the free end 16a of filler tube 16 through inner end wall aperture 20g; seat the inner wall 20d on filler tube flange 16b, and seat flange portion 20b on the axially outer annular face 12g of lip 12c; and assembly 10 is rotated to move the outer face 20j of keys 20i beneath the axially inner face 12f of lip 12c to move the keys into coaction with solid portions of the lip intermediate the keyways and trap the lip between flange 20b and keys 20i. The rotation is continued until the respective keys move into abutment with the respective stop structures 12e, whereafter a screw fastener 26, either standard or self tapping, is threaded through hole 20h for threaded engagement with a corresponding hole 16c in filler tube flange 16b. The installation of the fuel filler delivery assembly is now complete.

The invention will be seen to provide an improved fuel filler delivery assembly and, more specifically, a fuel filler delivery assembly that may be quickly and inexpensively installed on an associated motor vehicle.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A fuel filler assembly for positioning in an aperture in a panel of a motor vehicle to facilitate access to and to support the free end of a filler tube extending from the fuel tank of the vehicle, the assembly including a housing including:
   a sleeve having a diameter sized to fit in the aperture in the vehicle panel;
   an annular flange at an axially outer end of the sleeve sized to seat on the vehicle panel in surrounding relation to the aperture;
   a housing aperture defined at an axially inner end of the sleeve and sized to pass the free end of the filler tube therethrough; and
   a plurality of circumferentially spaced keys on an outer surface of the sleeve proximate the flange but spaced axially inwardly from the flange by a distance approximating the thickness of the vehicle panel,
   whereby the housing may be mounted in the vehicle panel by passing the keys inwardly through a plurality of circumferentially spaced keyways provided in the vehicle panel in surrounding relation to the aperture and thereafter rotating the housing to move the keys into coaction with solid portions of the panel intermediate the keyways.

2. A fuel filler assembly according to claim 1 wherein the housing includes an end wall at the axially inner end of the sleeve defining the housing aperture and the housing further includes a fastener hole in the inner end wall adapted to receive a fastener for coaction with the free end of the filler tube, whereby to preclude rotation of the housing relative to the panel.

3. A fuel filler assembly according to claim 1 wherein the assembly further includes a fuel filler door mounted on the housing for pivotal movement between a closed position seated on the annular flange to close the axially outer end of the sleeve and an open position pivoted outwardly away from the flange to allow access to the free end of the filler tube.

4. A motor vehicle body structure assembly for association with a free end of a filler tube extending from a fuel tank of a vehicle, the assembly comprising:
   a vehicle body panel defining an outer surface of the vehicle and having an aperture therein;
   a plurality of keyways provided in the panel in surrounding relation to the aperture; and
   a fuel filler assembly including a housing including:
      a sleeve having a diameter sized to be fitted in the panel aperture;
      an annular flange at an axially outer end of the sleeve sized to seat on the vehicle panel in surrounding relation to the panel aperture;
      a housing aperture defined at an axially inner end of the sleeve and sized to pass the free end of the filler tube therethrough; and
      a plurality of keys on an outer surface of the sleeve proximate the flange but spaced axially inwardly from the flange by a distance approximating the thickness of the body panel and having a size and circumferential spacing corresponding to the size and circumferential spacing of the keyways in the body panel,
   whereby the housing may be mounted in the body panel by passing the keys inwardly through the respective keyways and thereafter rotating the housing to bring the keys into coaction with solid portions of the body panel intermediate the keyways.

5. A motor vehicle body structure assembly according to claim 4, wherein the housing includes an end wall at the axially inner end of the sleeve defining the housing aperture and the housing further includes a fastener hole on the end wall adapted to receive a fastener for coaction with the free end of the filler tube, whereby to preclude rotation of the housing relative to the panel.

6. A motor vehicle body structure assembly according to claim 4, wherein the assembly further includes a fuel filler door mounted on the housing for pivotable movement between a closed position seated on the annular flange to close the axially outer end of the sleeve and an open position pivoted outwardly away from the flange to allow access to the free end of the filler tube.

7. A motor vehicle body structure assembly according to claim 4, wherein the vehicle body panel further defines a stop structure spaced angularly from each said keyway for coaction with the respective key to limit and define angular movement of the housing as the housing is rotated following the passage of the keys through the keyways.

8. A motor vehicle body structure assembly according to claim 4, wherein:
   the body panel includes an annular recess in surrounding relation to the aperture; and
   the flange is sized to fit in the annular recess.

9. A motor vehicle body structure assembly according to claim 8, wherein the fuel filler assembly further includes a fuel filler door mounted on the housing for movement between a closed position seated on the annular flange within the annular recess and generally flush with the body panel to close the axially outer end of the sleeve and an open position pivoted outwardly away from the flange to allow access to the free end of the filler tube.

10. A motor vehicle body structure assembly for association with a fuel tank of a vehicle, the assembly comprising:
   a vehicle body panel defining an outer surface of the vehicle and having an aperture therein;
   a plurality of keyways provided in the panel in surrounding relation to the aperture;
   a filler tube for communication with the fuel tank and defining a free end and a flange structure proximate but spaced from the free end;
   a fuel filler assembly including a housing including:
      a sleeve having a diameter sized to be fitted in the panel aperture;
      an annular flange at an axially outer end of the sleeve sized to seat on the vehicle panel in surrounding relation to the panel aperture;
      an end wall at an axially inner end of the sleeve having an aperture sized to pass the free end of the filler tube and allow the end wall to seat on the filler tube flange structure; and
      a plurality of keys on an outer surface of the sleeve proximate the flange but spaced axially inwardly from the flange by a distance approximating the thickness of the body panel and having a size and circumferential spacing corresponding to the size and circumferential spacing of the keyways in the body panel,
   whereby the housing may be mounted in the body panel by passing the keys inwardly through the respective keyways to seat the housing annular flange on the vehicle panel and the housing end wall on the filler tube flange structure and thereafter rotating the housing to bring the keys into coaction with solid portions of the body panel intermediate the keyways.

11. An assembly according to claim 10, wherein the assembly further includes a fastener fixedly interconnecting the sleeve end wall and the filler tube flange structure.

12. An assembly according to claim 11 wherein the assembly further includes a fuel filler door mounted on the housing for pivotal movement between a closed position seated on the annular flange to close the axially outer end of the sleeve and an open position pivoted outwardly away from the flange to allow access to the free end of the filler tube.

13. An assembly according to claim 12 wherein the vehicle body panel further defines a stop structure spaced angularly from each said keyway for coaction with the respective key to limit and define angular movement of the housing as the housing is rotated following the passage of the keys through the keyways.

14. A method of installing a fuel filler door assembly in an aperture in a panel of a vehicle to facilitate access to and to support the free end of a filler tube extending from the fuel tank of the vehicle, the method comprising:

provipding a housing having a sleeve having a diameter sized to fit in the aperture in the vehicle panel;

providing an annular flange at an axially outer end of the sleeve sized to seat on the vehicle panel in surrounding relation to the aperture;

providing a housing aperture defined at an axially inner end of the sleeve and sized to pass the free end of the filler tube therethrough;

providing a plurality of circumferentially spaced keys on an outer surface of the sleeve proximate the flange but spaced axially inwardly from the flange by a distance approximating the thickness of the vehicle panel;

providing a plurality of keyways in the panel in surrounding relation to the aperture and corresponding in size and circumferential spacing to the keys;

passing the keys inwardly through the keyways to seat the housing flange on the vehicle panel and pass the housing aperture over the free end of the filler tube; and rotating the housing to move the keys into coaction with solid portions of the panel intermediate the keyways.

15. A method according to claim 14, including the further steps of providing an end wall at the axially inner end of the sleeve defining the housing aperture and providing a fastener hole in the inner end wall adapted to receive a fastener for coaction with the free end of the filler tube to preclude rotation of the housing relative to the panel.

16. A method according to claim 14, including the further step of providing a stop structure spaced angularly from each said keyway for coaction with the respective key to limit and define angular movement of the housing as the housing is rotated following the passage of the keys through the keyways.

17. A method according to claim 15, including the further steps of:

providing a flange proximate to, but spaced from, the free end of the filler tube;

seating the sleeve end wall on the filler tube flange in response to the passage of the keys through the keyways; and fastening the sleeve end wall to the filler tube flange.

* * * * *